United States Patent
Baier

(10) Patent No.: US 10,876,896 B2
(45) Date of Patent: Dec. 29, 2020

(54) DEVICE AND METHOD FOR DETERMINING A POLARIZATION STATE OF AN ELECTROMAGNETIC WAVE

(71) Applicant: Fraunhofer-Gesellschaft zur Förderung der angewandten Forschung e.V., Munich (DE)

(72) Inventor: Moritz Baier, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/645,861

(22) PCT Filed: Sep. 14, 2018

(86) PCT No.: PCT/EP2018/074923
§ 371 (c)(1),
(2) Date: Mar. 10, 2020

(87) PCT Pub. No.: WO2019/053207
PCT Pub. Date: Mar. 21, 2019

(65) Prior Publication Data
US 2020/0209065 A1    Jul. 2, 2020

(30) Foreign Application Priority Data

Sep. 14, 2017   (DE) .................. 10 2017 216 358

(51) Int. Cl.
*G01J 4/04*      (2006.01)
*G01N 21/21*   (2006.01)
(Continued)

(52) U.S. Cl.
CPC ............... *G01J 4/04* (2013.01); *G01N 21/21* (2013.01); *G02B 5/3083* (2013.01); *G01J 2004/005* (2013.01)

(58) Field of Classification Search
CPC ...... G01N 21/21; G01N 21/211; G01N 21/23; G01N 2021/212; G01N 2021/213;
(Continued)

(56) References Cited

U.S. PATENT DOCUMENTS 5,081,348 A *  1/1992  Siddiqui .................. G01J 4/04
                                                               250/225
5,419,803 A     5/1995  Mumola
(Continued)

FOREIGN PATENT DOCUMENTS

CN        1349115 A    5/2002
CN        1249470 C    4/2006
(Continued)

OTHER PUBLICATIONS

Augustin, "Polarization handling in photonic integrated circuits", Eindhoven University of Technology, Jan. 1, 2008, pp. 1-171, Eindhoven University.
(Continued)

*Primary Examiner* — Gordon J Stock, Jr.
(74) *Attorney, Agent, or Firm* — The Webb Law Firm

(57) ABSTRACT

A device for determining a polarization state of an electromagnetic wave includes a power splitter that splits an electromagnetic input wave into at least three partial waves; and at least three polarization converters for changing the polarization state of the partial waves. One of the polarization converters is associated with one of the three partial waves. The device includes an output coupler to which the partial waves are supplied after passing through the respective polarization converter and which includes at least three outputs. The output coupler is configured and the polarization converters are arranged and configured such that output waves exiting from the outputs of the output coupler have an
(Continued)

intensity that each is dependent on one of the Stokes parameters of the input wave.

15 Claims, 2 Drawing Sheets

(51) Int. Cl.
*G02B 5/30* (2006.01)
*G01J 4/00* (2006.01)

(58) Field of Classification Search
CPC ....... G01N 2021/214; G01N 2021/215; G01N 2021/216; G01N 2021/217; G01N 2021/218; G02B 5/3083; G01J 4/00; G01J 4/02; G01J 4/04; G01J 2004/001; G01J 2004/002; G01J 2004/004; G01J 2004/005; G01J 2004/007; G01J 2004/008; G01M 11/30; G01M 11/33
USPC .................................................. 356/364–370
See application file for complete search history.

(56) References Cited

U.S. PATENT DOCUMENTS

| | | | |
|---|---|---|---|
| 5,477,327 A | 12/1995 | Bergman | |
| 5,706,212 A | 1/1998 | Thompson et al. | |
| 5,815,270 A * | 9/1998 | Lee | G01J 4/00 356/364 |
| 5,965,874 A * | 10/1999 | Aso | G01J 4/00 250/225 |
| 6,671,045 B1 * | 12/2003 | Lee | H04B 10/077 356/364 |
| 6,850,326 B2 * | 2/2005 | Thoma | G01J 9/00 356/364 |
| 6,909,506 B2 * | 6/2005 | Takagi | G01J 4/00 356/364 |
| 7,079,247 B2 * | 7/2006 | Shribak | G01J 4/04 356/364 |
| 7,099,006 B1 | 8/2006 | Johs et al. | |
| 7,443,503 B2 * | 10/2008 | Kubo | G01J 4/04 356/364 |
| 7,489,400 B1 | 2/2009 | He et al. | |
| 7,535,566 B1 | 5/2009 | Johs et al. | |
| 2001/0039014 A1 | 11/2001 | Bass et al. | |
| 2002/0093035 A1 | 7/2002 | Jin et al. | |
| 2003/0175157 A1 | 9/2003 | Micklash, II et al. | |
| 2004/0204450 A1 | 10/2004 | Bechle et al. | |
| 2005/0154269 A1 | 7/2005 | Cameron | |
| 2012/0105783 A1 | 5/2012 | Pau et al. | |
| 2017/0187458 A1 * | 6/2017 | Winzer | H04B 10/802 |

FOREIGN PATENT DOCUMENTS

| | | |
|---|---|---|
| CN | 203011816 U | 6/2013 |
| CN | 106124416 A | 11/2016 |
| CN | 205941337 U | 2/2017 |
| CN | 206038517 U | 3/2017 |
| FR | 1417425 A | 11/1965 |
| GB | 1140046 | 1/1969 |

OTHER PUBLICATIONS

Ghosh et al., "Integrated Stokes Vector Analyzer on InP", 2016 OptoElectronics and Communications Conference held jointly with the 2016 International Conference on Photonics in Switching, 2016, pp. 1-3.

Ghosh et al., "Polarization-analyzing circuit on InP for integrated Stokes vector receiver", Optics Express, May 29, 2017, pp. 12303-12310, vol. 25:11, Optical Society of America.

Noe et al., "Spectral Polarimeters Based on Integrated Acousto-Optical Ti:LiNbO3 TE—TM Converters", Fiber & Integrated Optics, 1999, pp. 273-286, vol. 18:4, Taylor & Francis.

Saida et al., "In-band OSNR monitor with high-speed integrated Stokes polarimeter for polarization division multiplexed signal", Optics Express, 2012, pp. B165-B170, vol. 20:26, Optical Society of America.

Zaitsu et al., "Self-Aligned InP/InGaAsP Polarization Converter for Polarization-Multiplexed Photonic Integrated Circuits", Optical Fiber Communications Conference, 2013, paper No. OTh4I.3, Optical Society of America.

* cited by examiner

DEVICE AND METHOD FOR DETERMINING A POLARIZATION STATE OF AN ELECTROMAGNETIC WAVE

CROSS-REFERENCE TO RELATED APPLICATIONS

This application is the United States national phase of International Application No. PCT/EP2018/074923 filed Sep. 14, 2018, and claims priority to German Patent Application No. 10 2017 216 358.5 filed Sep. 14, 2017, the disclosures of which are hereby incorporated by reference in their entirety.

BACKGROUND OF THE INVENTION

Field of the Invention

The disclosure relates to a device for determining a polarization state of an electromagnetic wave and to a method for determining a polarization state of an electromagnetic wave.

Description of Related Art

The prior art discloses polarimeters which serve to determine the polarization state of an electromagnetic wave, in particular of a light wave. In particular, a polarimeter can be used to determine the Stokes parameters S1, S2, S3 characterizing the polarization state. The known polarimeters, however, include discrete optical (e.g. fiber-optical) components, in particular adjustable polarizers. Such components can have mechanical instabilities which can lead to an impairment of the measurement accuracy. In addition, a polarimeter of optically integrated construction is known from the article S. Ghosh et al, "Integrated Stokes Vector Analyzer on InP", 2016, 21st OptoElectronics and Communications Conference (OECC). The manufacture of this polarimeter, however, is complex and hence expensive.

SUMMARY OF THE INVENTION

The problem underlying the proposed solution consists in indicating a possibility for determining a polarization state as exactly as possible and as easily realizable as possible.

This problem is solved by providing the device with features as described herein and the method with features as described herein.

Accordingly, there is provided a device for determining a polarization state of an electromagnetic wave, comprising
a power splitter that splits an electromagnetic input wave into at least three partial waves;
at least three polarization converters for changing the polarization state of the partial waves, wherein one of the polarization converters each is associated with one of the three partial waves; and
an output coupler to which the partial waves are supplied after passing through the respective polarization converter and which includes at least three outputs, wherein the output coupler is configured and the polarization converters are arranged and configured such that output waves exiting from the outputs of the output coupler have an intensity that each is dependent (e.g. linearly, in particular proportionally) on one of the Stokes parameters of the input wave.

Thus, by measuring the intensities of the three output waves, the three Stokes parameters S1, S2, S3 and hence the polarization state of the input wave can be determined, wherein in particular from each of the output waves exactly one of the Stokes parameters S1, S2, S3 each is determined. The Stokes parameters S0, S1, S2, S3 are defined by means of the amplitude $E_{TE}$ and $E_{TM}$ of the TE and TM fractions of the electromagnetic input wave, as follows:

$$S_1 = |E_{TE}|^2 - |E_{TM}|^2,\ S_2 = 2E_{TE}E_{TM} \cos \Delta,\ S_3 = 2E_{TE}E_{TM} \sin \Delta,\ S_0 = \sqrt{S_1^2 + S_2^2 + S_3^2}$$

Here, $\Delta$ designates the difference of the phases of the TE fraction and the TM fraction of the wave. The input wave to be examined in particular is a light wave.

The output waves in particular are obtained with an intensity (output intensity) each dependent (in particular linearly) on one of the Stokes parameters solely by the cooperation of the polarization converters and the output coupler and by maintaining respectively specified distances of the polarization converters from the output coupler. Correspondingly, it is conceivable that the output waves are detected without having previously passed through a polarization filter. The output intensities depending on the Stokes parameters thus are obtained in particular solely by a targeted interference of the partial waves exiting from the polarization converters and covering a specified path length (namely the respective distance between the polarization converter and the output coupler).

As mentioned, the intensities of the output waves for example each are linearly dependent on one of the Stokes parameters of the input wave. What is of course also conceivable is a different functional relationship between the intensities of the output waves and the Stokes parameters of the input wave. For example, the intensity of at least one first output wave is dependent (in particular only) from the Stokes parameters S0 and S1, the intensity of at least one second output wave is dependent (in particular only) from the Stokes parameters S0 and S2, and the intensity of at least one third output wave is dependent (in particular only) from the Stokes parameters S0 and S3.

According to one embodiment, the partial waves exiting from the power splitter each are coupled into the associated polarization converter via a waveguide and/or each are guided from the polarization converter to the output coupler by means of a waveguide.

The waveguides for example each are optically integrated waveguides. Such integrated waveguides are generated by structuring material layers (e.g. semiconductor layers) arranged on a substrate.

It is also possible that the waveguides have a birefringence different from zero. The birefringence of the waveguides in particular can be utilized to generate a specifiable change of the phase difference between the TE fraction and the TM fraction of the partial light waves.

For example, the device according to the solution at least partly is configured in the form of a monolithically integrated component (e.g. a semiconductor component), wherein in particular the power splitter, the polarization converters, the output coupler and the above-mentioned waveguides are realized in the form of integrated components. It is possible that the device according to the solution is realized by III-V or SOI (Silicon-on-Insulator) technology, i.e. by structuring material layers which are arranged on a substrate of a III-V semiconductor or on a substrate of an electrically insulating material provided with a silicon layer.

The monolithic integration can reduce the manufacturing costs and in particular provides for compact dimensions of the device (e.g. chip sizes of less than 2×0.25 mm$^2$). Furthermore, the opto-mechanical stability of the device can be increased; in particular because only one optical coupling point exists between a measurement object and the device.

The power splitter for example is a 1×3 coupler. It is conceivable that the power splitter is configured in the form of an (in particular optically integrated) MMI (Multi-Mode-Interference) coupler. In addition, the power splitter can be configured such that the exiting partial waves at least approximately have the same polarization state and/or at least approximately the same intensity, namely in particular one third of the intensity of the input wave.

The output coupler in particular is configured in the form of a 3×3 coupler, which is e.g. an MMI coupler.

However, the proposed solution is of not limited to a particular configuration of the power splitter and/or of the output coupler. It is conceivable in particular that the power splitter comprises more than three (e.g. four, five or six) outputs, and the output coupler correspondingly comprises more than three inputs and outputs (e.g. four, five or six, respectively), i.e. the device according to the proposed solution has more than three paths. For example, an N×N coupler (for example a 4×4, 5×5 or 6×6 coupler) or a 1×N coupler is used as power splitter and/or a N×N coupler (for example likewise 4×4, 5×5 or 6×6 coupler) is used as an output coupler. Such power splitters or output couplers likewise can be configured as an MMI.

According to another embodiment, a receiver for receiving one of the output waves each is associated with each output of the output coupler. The receivers in particular each are a photodiode. It is possible that the photodiodes likewise are configured as integrated optical components. In the case of a fully monolithic configuration of the device according to the proposed solution photodiodes hence are also realized as integrated components beside the power splitter, the polarization converters, the output coupler and the waveguides. What is also conceivable is an only partly monolithic configuration in which for example at least the output coupler and the photodiodes associated with its outputs are of monolithically integrated design.

It is conceivable that in addition to the photodiodes the device merely includes two different passive-optical building blocks, namely the power splitter and the output coupler, which as mentioned can each be configured in the form of an MMI, and the polarization converters. The fully monolithic configuration for example provides for high measurement speeds in the range of n×10 Gs/s. For example, beside the bandwidth of an electronic processing unit the measurement speed only is limited by the bandwidth of the photodiodes. By means of monolithically integrated (waveguide-integrated) photodiodes, bandwidths of more than 100 GHz can be achieved.

What is also possible, however, is a hybrid design of the device according to the solution, wherein e.g. the waveguides are configured in the form of polymer waveguides and/or the photodiodes are bonded by flip-chip technology.

Furthermore, the polarization converters each can effect a change of the phase difference 4 between the TE fraction and the TM fraction of the respective partial wave, wherein the changes of the phase differences in particular are different. For example, the first polarization converter can cause another change of the phase difference 4 than the second and/or the third polarization converter.

In addition, the polarization converters can be arranged at different distances from the output coupler. The desired distance is determined (e.g. by means of a numerical method) such that the intensity of the output light waves exiting from the output coupler each is (in particular linearly) dependent on one of the Stokes parameters of the input light wave, as already explained above. It is also conceivable, however, that at least two of the polarization converters are arranged at least approximately at the same distance to the output coupler.

The solution also relates to a method for determining a polarization state of an electromagnetic wave, comprising:
splitting an electromagnetic input wave into at least three partial waves;
changing the polarization state of the partial waves by means of three polarization converters, wherein one of the polarization converters each is associated with one of the three partial waves; and
generating output waves by means of an output coupler, wherein the output coupler to which the partial waves are supplied after passing through the respective polarization converter and which includes at least three outputs, is configured and the polarization converters are arranged and configured such that output waves exiting from the outputs of the output coupler have an intensity that each is (e.g. linearly) dependent on one of the Stokes parameters of the input wave.

The embodiments explained above with respect to the device according to the proposed solution analogously can of course also be used for developing the method according to the proposed solution.

BRIEF DESCRIPTION OF THE DRAWINGS

The solution will be explained in detail below by means of embodiments with reference to the Figures.

DESCRIPTION OF THE INVENTION

Figure 1:
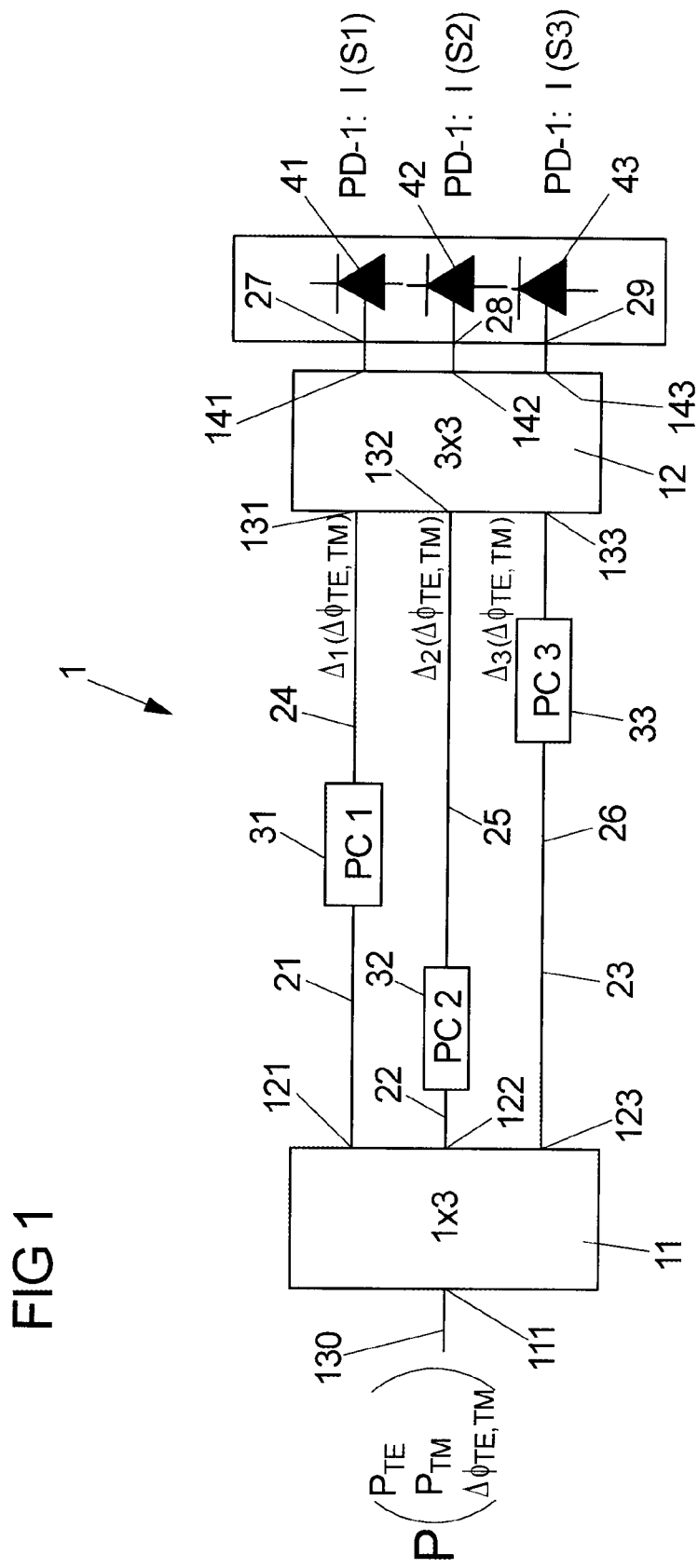
FIG. 1 shows a block diagram of a device for determining a polarization state of an electromagnetic wave (in the form of a light wave) according to an embodiment.

The device 1 according to the proposed solution as shown in FIG. 1 comprises a power splitter in the form of an input MMI 11. The input MMI 11 is configured as a 1×3 MMI and correspondingly includes an input 111 and three outputs 121, 122, 123. Via the input 111 an input lightwave guided in an input waveguide 130 is coupled into the input MMI 11. The power P (correspondingly the intensity) of the input light wave depends on the Stokes parameters S1, S2, S3 and hence on the power$_{TE}$ in the TE fraction $E_{TE}$ of the input light wave, the power $P_{TM}$ in its TM fraction $E_{TM}$ and the difference $\Delta$ between the phase $\Phi_{TE}$ of the TE fraction $E_{TE}$ and the phase $\Phi_{TM}$ of the TM fraction $E_{TM}$.

The partial light waves coupling out of the outputs 121, 122, 123 of the input MMI 11, which each at least approximately have one third of the intensity of the input light wave, each are guided to a polarization converter (PC 1, PC 2, PC 3) 31, 32, 33 via waveguides 21, 22, 23. The partial light waves exiting from the polarization converters 31, 32, 33 in turn are each guided to an output coupler in the form of an output MMI 12 via further waveguides 24, 25, 26. The output MMI 12 is a 3×3 coupler, i.e. a coupler which includes three inputs 131, 132, 133 and three outputs 141, 142, 143. The three output light waves exiting from the outputs 141, 142, 143 of the output MMI 12 each are supplied to a photodiode (PD-1, PD-2, PD-3) 41, 42, 43 via output waveguides 27, 28, 29.

The polarization converters 31, 32, 33 each change the polarization state of the partial waves, wherein after passing through the polarization converters 31, 32, 33 different changes Δ1, Δ2 and Δ3 of the difference Δ between the phase of the TE fraction and the TM fraction of the partial waves each are obtained. In addition, the output MMIs 12 are dimensioned in such a way and the polarization converters 31, 32, 33 are placed at such a distance to the same that the intensity of the light exiting from the outputs 141, 142, 143 of the output MMI 12 and detected by the photodiodes 41, 42, 43 each is (in particular linearly) dependent on one (for example exactly one) of the Stokes parameters S1, S2, S3 of the input light wave. For example, the intensity of the output light wave detected by the photodiode 41 is proportional to the sum of the Stokes parameters S1 and S0, the intensity of the second output light wave detected by the second photodiode 42 is proportional to the sum of the Stokes parameters S2 and S0, and the intensity of the third output light wave detected by the third photodiode 43 is proportional to the sum of the Stokes parameters S3 and S0.

By means of the output MMI 12 and the correct placement of the polarization converters 31, 32, 33 relative to the output MMI 12 the Stokes parameters S1, S2, S3 can be obtained directly from the intensities of the output light waves, i.e. from the signal of the photodiodes 41, 42, 43, without having to provide a polarization filter in front of the photodiodes 41, 42, 43. The distances of the polarization converters 31, 32, 33 from the output MMI 12 and possibly also from the input MMI 11 can be determined in particular by taking account of the geometry of the output MMI 12 by means of a numerical method, i.e. by calculating a model comprising in particular the polarization converters 31, 32, 33, the waveguides 21, 22, 23 and/or 24, 25, 26 and the output MMI 12.

The device 1 according to the solution as shown in FIG. 1 is a monolithically integrated component which in particular has an at least substantially planar geometry. Correspondingly, all components shown in FIG. 1, in particular the MMIs 11, 12, the waveguides 130, 121-123, 131-133, 141-143 and the photodiodes 41, 42, 43 are arranged on a common substrate (not shown) and realized by structuring material layers arranged on this substrate. The photodiodes 41, 42, 43 for example are waveguide-integrated photodiodes.

Figure 2:
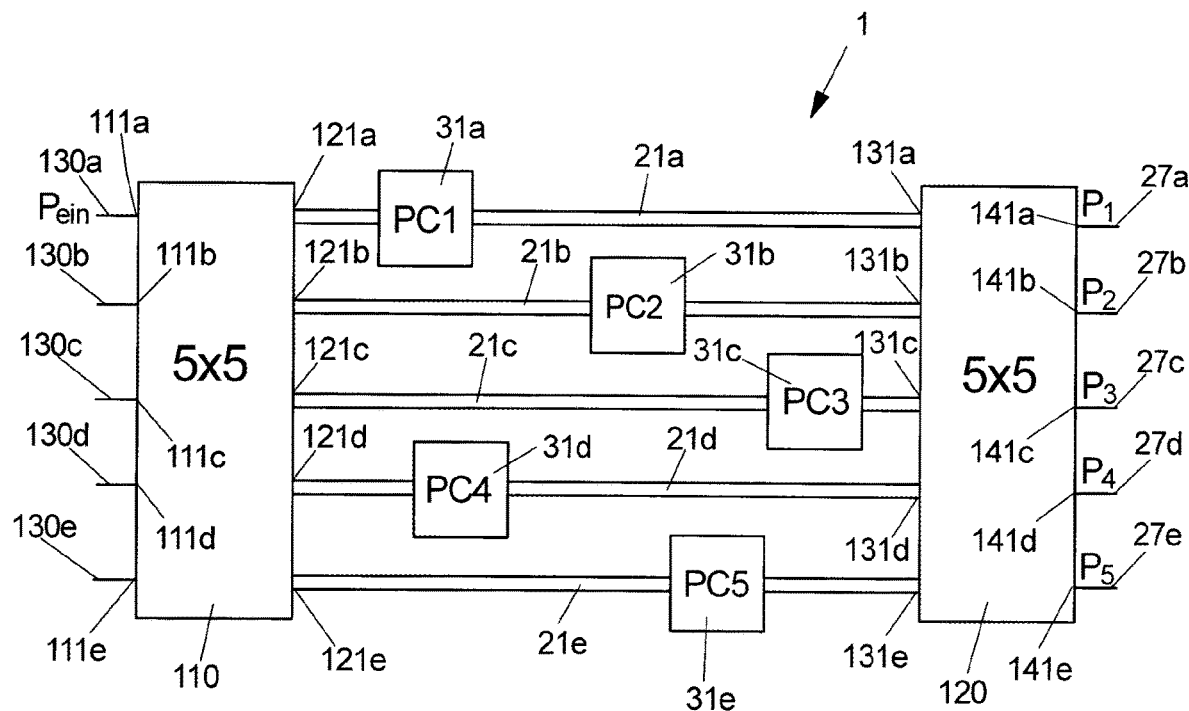
FIG. 2 schematically shows a device according to another embodiment.

FIG. 2 relates to a modification of FIG. 1, according to which a 5×5 coupler is used as an input power splitter; in particular in the form of a 5×5 MMI 110. The input MMI 110 correspondingly has five inputs 111a-e and five input waveguides 130a-e. A light wave coupled in via one of these input waveguides 130a-e (for example via the upper waveguide 130a) is split into five partial waves which each are supplied to a polarization converter 31a-e via waveguides 21a-e.

A 5×5 output MMI 120 is used as an output coupler, which correspondingly has five inputs 131a-e and five inputs 141a-e. The outputs 141a-e are coupled with one output waveguide 27a-e each, via which output light waves with the output power $P_1$-$P_5$ each are supplied to a photodiode not shown in FIG. 2. Analogous to FIG. 1, the polarization converters 31a-e are positioned relative to the output MMI 120 such that the intensity of the light waves exiting from the output MMI 120 via the outputs 141a-e each is dependent on at least one of the Stokes parameters of the input light wave (with the power $P_{in}$). It is also conceivable that the intensities of the light waves exiting from the output MMI 120 at least partly depend on different combinations of the Stokes parameters of the input light wave.

Figure 3:
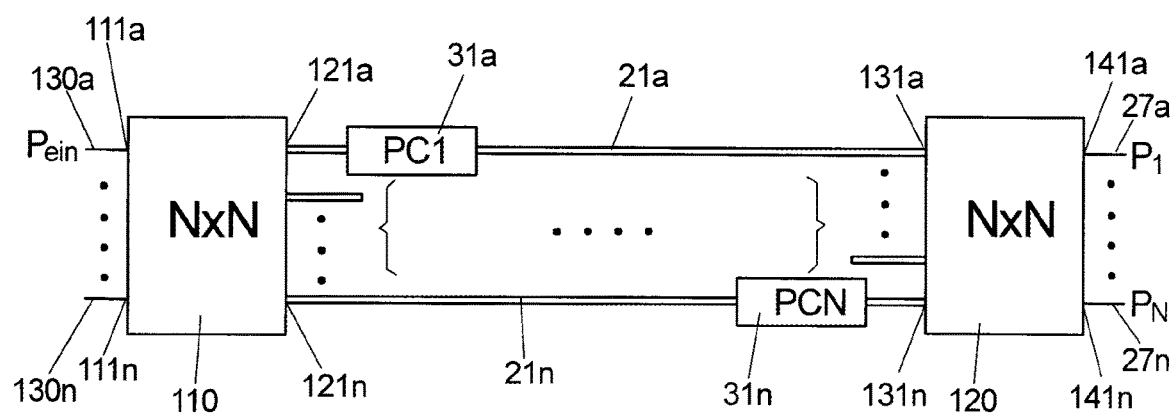
FIG. 3 shows a generalization of FIG. 2.

FIG. 3 relates to a generalization of the concept of FIG. 3 to the use of an N×N input power splitter and an N×N output coupler.

The invention claimed is:

1. A device for determining a polarization state of an electromagnetic wave, comprising
a power splitter that splits an electromagnetic input wave into at least three partial waves;
at least three polarization converters for changing the polarization state of the partial waves, wherein one of the polarization converters each is associated with one of the three partial waves, and
an output coupler to which the partial waves are supplied after passing through the respective polarization converter and which includes at least three outputs,
wherein the output coupler is configured and the polarization converters are arranged and configured such that output waves exiting from the outputs of the output coupler have an intensity that each is dependent on one of the Stokes parameters of the input wave.

2. The device according to claim 1, wherein the partial waves exiting from the power splitter each are coupled into the associated polarization converter via a waveguide and/or each are guided from the polarization converter to the output coupler by means of a waveguide.

3. The device according to claim 2, wherein the waveguides each are optically integrated waveguides.

4. The device according to claim 2, wherein the waveguides have a birefringence different from zero.

5. The device according to claim 1, wherein the device at least partly is a monolithically integrated component.

6. The device according to claim 5, wherein the component is realized by III-V or SOI technology.

7. The device according to claim 1, wherein the power splitter is configured such that the partial waves exiting from the same at least approximately have the same polarization state and/or intensity.

8. The device according to claim 1, wherein the power splitter is an MMI coupler.

9. The device according to claim 1, wherein the output coupler is an MMI coupler.

10. The device according to claim 1, wherein with each output of the output coupler a receiver each for receiving one of the output waves is associated.

11. The device according to claim 9, wherein the receivers each are formed by a photodiode.

12. The device according to claim 1, wherein the polarization converters each produce a change of the phase difference and the relative amplitude between the TE fraction and the TM fraction of the respective partial light wave, wherein the produced changes of the phase differences are different.

13. The device according to claim 1, wherein the polarization converters are arranged at different distances to the output coupler.

14. The device according to claim 1, wherein the intensities of the output waves are linearly dependent each on one of the Stokes parameters of the input wave.

15. A method for determining a polarization state of an electromagnetic wave, comprising:
splitting an electromagnetic input wave into at least three partial waves;
changing the polarization state of the partial waves by means of three polarization converters, wherein one of the polarization converters each is associated with one of the three partial waves, and
generating output waves by means of an output coupler, to which the partial waves are supplied after passing through the respective polarization converter and which includes at least three outputs, wherein the output coupler is configured and the polarization converters are arranged and configured such that output waves exiting from the outputs of the output coupler have an intensity that each is dependent on one of the Stokes parameters of the input wave.

* * * * *